US012408649B2

(12) United States Patent
Schwartz et al.

(10) Patent No.: US 12,408,649 B2
(45) Date of Patent: Sep. 9, 2025

(54) CONFINED ENCLOSURE INSECT CAPTURE DEVICE WITH ADHESIVE GAP

(71) Applicant: Ecolab USA Inc., Saint Paul, MN (US)

(72) Inventors: Daniel Ronald Schwartz, Saint Paul, MN (US); Jonathan Lee Glawe, Saint Paul, MN (US); Magdalene Rose White, Saint Paul, MN (US); Joshua J. Lanz, Saint Paul, MN (US); Douglas B. Gardner, Saint Paul, MN (US); Larry Lake, Saint Paul, MN (US); Daniel Davis Anderson, Saint Paul, MN (US)

(73) Assignee: ECOLAB USA INC., Saint Paul, MN (US)

( * ) Notice: Subject to any disclaimer, the term of this patent is extended or adjusted under 35 U.S.C. 154(b) by 693 days.

(21) Appl. No.: 17/446,576

(22) Filed: Aug. 31, 2021

(65) Prior Publication Data

US 2022/0061300 A1 Mar. 3, 2022

Related U.S. Application Data

(60) Provisional application No. 62/706,671, filed on Sep. 2, 2020.

(51) Int. Cl.
*A01M 1/14* (2006.01)
(52) U.S. Cl.
CPC ........... *A01M 1/14* (2013.01); *A01M 2200/01* (2013.01)
(58) Field of Classification Search
CPC ...................................... A01M 1/14
See application file for complete search history.

(56) References Cited

U.S. PATENT DOCUMENTS 809,951 A * 1/1906 Hixson .................. A01M 1/14
43/115
828,128 A * 8/1906 Laude .................... A01M 1/14
43/115
(Continued)

FOREIGN PATENT DOCUMENTS

CN 1092481 C 10/2002
EP 1094709 A1 5/2001
(Continued)

OTHER PUBLICATIONS

International Searching Authority in connection with PCT/US2021/048377 filed Aug. 31, 2021, "The International Search Report and the Written Opinion of the International Searching Authority, or the Declaration", 65 pages, mailed Dec. 10, 2021.
(Continued)

*Primary Examiner* — Jessica B Wong
(74) *Attorney, Agent, or Firm* — McKee, Voorhees & Sease, PLC

(57) ABSTRACT

An insect capture device is used to monitor, capture, and/or kill insects. The device has a raised portion to create a gap between a surface and the device to entice insects to pass under. At the raised portion, a glue board includes an adhesive facing the surface. As the insect passes under the raised portion, the insect can unknowingly become attached to the adhesive portion and stuck thereto. To aid in installing the glue board, one or more sections of the glue board can be free of adhesive to connect or fit to a part of the device to hold the glue board in place, while also allowing for easy removal to replace the glue board with a new one, free of captured insects.

15 Claims, 17 Drawing Sheets

(56) References Cited

U.S. PATENT DOCUMENTS

| | | | | |
|---|---|---|---|---|
| 1,112,064 | A * | 9/1914 | Gordon | A01M 1/14 D22/122 |
| 1,802,774 | A * | 4/1931 | Nixon | A01M 1/14 43/115 |
| 4,031,654 | A * | 6/1977 | Gray | A01M 1/14 43/114 |
| 4,112,609 | A | 9/1978 | Kaveloski | |
| 4,126,959 | A * | 11/1978 | Graham | A01M 3/022 43/136 |
| 4,263,740 | A | 4/1981 | Hemsarth | |
| 4,709,504 | A * | 12/1987 | Andric | A01M 1/14 43/121 |
| 4,876,823 | A * | 10/1989 | Brunetti | A01M 1/14 43/124 |
| 5,090,153 | A | 2/1992 | Mullen et al. | |
| 5,771,628 | A | 6/1998 | Nobbs | |
| 5,953,854 | A | 9/1999 | Hyatt | |
| 6,219,960 | B1 | 4/2001 | Contadini et al. | |
| 6,343,434 | B1 | 2/2002 | Petti | |
| 8,291,638 | B2 * | 10/2012 | Larsen | A01M 1/10 43/136 |
| 8,793,928 | B2 * | 8/2014 | Larsen | A01M 1/145 43/113 |
| 10,123,522 | B2 * | 11/2018 | Johnston | A01M 1/103 |
| 10,412,952 | B2 * | 9/2019 | Johnston | A01M 1/103 |
| 2001/0054249 | A1 | 12/2001 | Baker | |
| 2004/0088905 | A1 | 5/2004 | Price et al. | |
| 2006/0191189 | A1 | 8/2006 | Mayo | |
| 2008/0072475 | A1 | 3/2008 | Nelson et al. | |
| 2010/0024278 | A1 | 2/2010 | Simchoni-Barak et al. | |
| 2013/0312313 | A1 * | 11/2013 | Lefkowitz | A01M 1/02 43/114 |
| 2015/0060565 | A1 | 3/2015 | Furner | |
| 2015/0216159 | A1 | 8/2015 | Vasudeva | |
| 2016/0000060 | A1 | 1/2016 | Sandford | |
| 2016/0120164 | A1 | 5/2016 | Li | |
| 2016/0242401 | A1 * | 8/2016 | Johnston | A01M 1/103 |
| 2016/0242402 | A1 * | 8/2016 | Johnston | A01M 1/026 |
| 2018/0184635 | A1 * | 7/2018 | Studer | A01M 1/04 |
| 2019/0357515 | A1 * | 11/2019 | Johnston | A01M 1/14 |
| 2020/0037595 | A1 * | 2/2020 | Cook | A01M 1/2005 |
| 2020/0296950 | A1 * | 9/2020 | Bäckmark | A01M 1/14 |
| 2021/0259231 | A1 * | 8/2021 | Akiba | A01M 1/103 |
| 2022/0386585 | A1 * | 12/2022 | Mailleux | A01N 25/18 |

FOREIGN PATENT DOCUMENTS

| | | |
|---|---|---|
| EP | 2305028 A1 | 4/2011 |
| EP | 3566574 A1 | 11/2019 |
| JP | 2016026483 A | 2/2016 |
| KR | 101202825 B1 | 11/2012 |
| WO | 2014134371 A1 | 9/2014 |
| WO | 2016134265 A1 | 8/2016 |
| WO | 2018131840 A1 | 7/2018 |

OTHER PUBLICATIONS

International Searching Authority, "The International Search Report and the Written Opinion of the International Searching Authority, or the Declaration", issued in connection with Application No. PCT/US2016/018690, pp. 1-9, mailed Jun. 6, 2016.

* cited by examiner

CONFINED ENCLOSURE INSECT CAPTURE DEVICE WITH ADHESIVE GAP

CROSS-REFERENCE TO RELATED APPLICATIONS

This application claims priority under 35 U.S.C. § 119 to U.S. Provisional Application Ser. No. 62/706,671, filed Sep. 2, 2020. The provisional patent application is herein incorporated by reference in its entirety, including without limitation, the specification, claims, and abstract, as well as any figures, tables, appendices, or drawings thereof.

FIELD OF THE INVENTION

The invention relates generally to an insect pest monitor and/or product transfer station. More particularly, but not exclusively, the invention relates to a device including a glue board wherein the glue board includes various sections of glue and non-glue to allow for easy and accurate installation of the glue board with the insect capture device.

BACKGROUND OF THE INVENTION

The background description provided herein gives context for the present disclosure. Work of the presently named inventors, as well as aspects of the description that may not otherwise qualify as prior art at the time of filing, are neither expressly nor impliedly admitted as prior art.

Crawling pests, such as the German cockroach (*Blattella germanica*) are well known to carry disease and are widely considered to be undesirable insects. The German cockroach is a smaller member of the cockroach family and is frequently a pest in food processing and preparation areas including hotels, nursing homes, and other institutions. They are widespread pests capable of surviving in many different parts of the world. They are a positively thigmotactic insect, meaning that they generally react to a physical stimulus, and therefore prefer tight spaces. Such insects frequently hide out of sight in cracks and crevices that are easy for humans to overlook.

Additional insects, including flying insects, such as Indian meal moths and other types of moths, may also be enticed to tight spaces.

Numerous designs of insect pest stations are commercially available, some use large containment areas, while others use wide open, flat surfaces with various forms of attractants and capture mechanisms, such as glue boards. Problems exist with such devices. For example, cockroaches have been observed to contact the edges of glue boards and escape. It is known that when such glue boards are rolled into cylinders, cockroaches would fill the underside of the glue roll. Similarly, a flat glue board can be placed with its glue side or sticky side down and another flat glue board was placed with its sticky side up. It has been found that the entire surface of the glue side down board was filled while only the edges of the sticky side up board were filled. Thus, it is desirable to provide an insect monitor that is directed to insets who desire small, narrow, or covered spaces.

Insect devices exist wherein an adhesive is placed relative to the device so an insect moves generally underneath the adhesive and gets "caught" by the overhead adhesive. For example, U.S. Pat. Nos. 10,123,522 and 10,412,952, which are co-owned and incorporated by reference in their entirety, disclose a station that has a cutout wherein an adhesive is positioned through the cutout and faced generally downward to capture insects.

However, in order to improve upon that which exists, there is a need in the art for a combination of a capture device and adhesive in which the adhesive is easily and accurately positioned relative to the capture device to ensure the best possible capturing of insects.

SUMMARY OF THE INVENTION

The following objects, features, advantages, aspects, and/or embodiments, are not exhaustive and do not limit the overall disclosure. No single embodiment need provide each and every object, feature, or advantage. Any of the objects, features, advantages, aspects, and/or embodiments disclosed herein can be integrated with one another, either in full or in part, even if not explicitly disclosed.

It is a primary object, feature, and/or advantage of the invention to improve on or overcome the deficiencies in the art.

It is a further object, feature, and/or advantage to provide a combination of a device and glue board to capture insects passing thereby.

It is still yet a further object, feature, and/or advantage to provide a glue board that can be easily and accurately installed in an insect capture device.

It is another object, feature, and/or advantage to have a combination glue board and capture device wherein the glue board is positioned overhead of an area in which an insect will pass.

It is still another object, feature, and/or advantage to provide a method of installing a glue board into a capture device that allows for quick, easy, and full exposure of the adhesive portion of the glue board.

It is yet another object, feature, and/or advantage to provide a glue board having an adhesive area, one or more non-adhesive areas, and a cover paper to allow for installation of the glue board.

Aspects of the disclosure, including the glue board disclosed herein can be used in a wide variety of applications. For example, it is to be appreciated that it could be used as a standalone device. In addition, it could be used with a number of housings or devices for mounting and capturing insects, including those not explicitly disclosed herein.

It is preferred the apparatus be safe, cost effective, and durable.

At least one embodiment disclosed herein comprises a distinct aesthetic appearance. Ornamental aspects included in such an embodiment can help capture a consumer's attention and/or identify a source of origin of a product being sold. Said ornamental aspects will not impede functionality of the invention.

Methods can be practiced which facilitate use, manufacture, assembly, maintenance, and repair of an insect device which accomplish some or all of the previously stated objectives.

The apparatus, combination, or portions thereof can be incorporated into systems or kits which accomplish some or all of the previously stated objectives.

According to some aspects of the present disclosure, [first independent claim 1].

According to some additional aspects of the present disclosure, [dependent claims].

According to some other aspects of the present disclosure, [subsequent independent claim].

These and/or other objects, features, advantages, aspects, and/or embodiments will become apparent to those skilled in the art after reviewing the following brief and detailed descriptions of the drawings. Furthermore, the present disclosure encompasses aspects and/or embodiments not expressly disclosed but which can be understood from a reading of the present disclosure, including at least: (a) combinations of disclosed aspects and/or embodiments and/or (b) reasonable modifications not shown or described.

BRIEF DESCRIPTION OF THE DRAWINGS

Several embodiments in which the invention can be practiced are illustrated and described in detail, wherein like reference characters represent like components throughout the several views. The drawings are presented for exemplary purposes and may not be to scale unless otherwise indicated.

Figure 1:
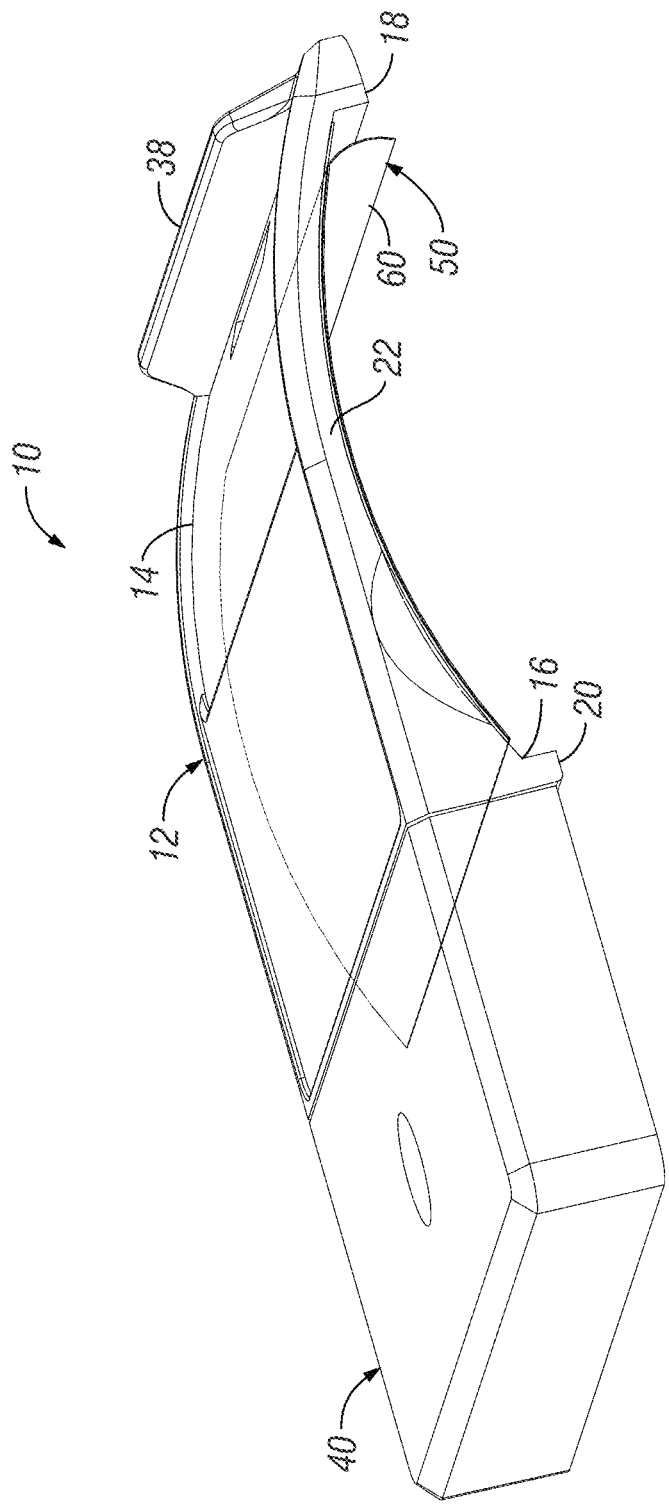
FIG. 1 is a perspective view of an insect capture device or station according to aspects and embodiments disclosed herein.

An artisan of ordinary skill need not view, within isolated figure(s), the near infinite number of distinct permutations of features described in the following detailed description to facilitate an understanding of the invention.

DETAILED DESCRIPTION OF THE INVENTION

The present disclosure is not to be limited to that described herein. Mechanical, electrical, chemical, procedural, and/or other changes can be made without departing from the spirit and scope of the invention. No features shown or described are essential to permit basic operation of the invention unless otherwise indicated.

Unless defined otherwise, all technical and scientific terms used above have the same meaning as commonly understood by one of ordinary skill in the art to which embodiments of the invention pertain.

The terms "a," "an," and "the" include both singular and plural referents.

The term "or" is synonymous with "and/or" and means any one member or combination of members of a particular list.

The terms "invention" or "present invention" are not intended to refer to any single embodiment of the particular invention but encompass all possible embodiments as described in the specification and the claims.

The term "about" as used herein refer to slight variations in numerical quantities with respect to any quantifiable variable. Inadvertent error can occur, for example, through use of typical measuring techniques or equipment or from differences in the manufacture, source, or purity of components.

The term "substantially" refers to a great or significant extent. "Substantially" can thus refer to a plurality, majority, and/or a supermajority of said quantifiable variable, given proper context.

The term "generally" encompasses both "about" and "substantially."

The term "configured" describes structure capable of performing a task or adopting a particular configuration. The term "configured" can be used interchangeably with other similar phrases, such as constructed, arranged, adapted, manufactured, and the like.

Terms characterizing sequential order, a position, and/or an orientation are not limiting and are only referenced according to the views presented.

The "scope" of the invention is defined by the appended claims, along with the full scope of equivalents to which such claims are entitled. The scope of the invention is further qualified as including any possible modification to any of the aspects and/or embodiments disclosed herein which would result in other embodiments, combinations, subcombinations, or the like that would be obvious to those skilled in the art.

Exemplary features and aspects of the invention for monitoring, attracting, and killing insects, such as cockroaches, beetles, Indian meal moths, etc., within a short window of time are illustrated in FIGS. 1-6. As shown in the exemplary embodiments of FIGS. 1-6, the insect capture device 10, which also may be referred to as an insect station, system, capture station, monitoring station, trap or the like, includes generally a housing 12, a base 40, and an adhesive member 50. It should initially be noted that not all of the elements may be required in all embodiments. For example, as will be understood, while the base 40 can be utilized to aid in positioning and/or temporarily attaching the device 10 to a surface, it need not be required. Instead, the housing 12 as is shown in the figures, or in a slightly modified manner, can be positioned, affixed, or otherwise used with a surface without the use of a base 40, such as with an adhesive, mechanical fastener, or other means. Therefore, the invention should not be limited to the explicit embodiments as shown.

Referring back to the figures, the insect capturing device 10 has a housing 12, which includes a raised portion 22 to create a gap 24 between the raised portion 22 and a surface for use of the device 10. It is envisioned that the device 10 could be used with any number of surfaces, including floors, walls, crawl spaces, interior, exterior, and the like. As will be appreciated, the raised portion 22 of the housing 12 creating said gap 24 will provide an enticing area for insects to enter. The combination of the raised portion 22 and an adhesive member 50, such as a glue board, as will be understood, will aid in trapping said insect with the device 10. Still further, a pesticide or other killing agent could then be used to kill the captured insects. According to some embodiments, the pesticide could be used to kill any insect that is not caught or captured by the adhesive, and the captured insects could be killed by the pesticide or otherwise. In addition, it is contemplated that a pesticide and/or bait could be used without the adhesive glue board. The device 10 provides a harboring area for the insects, which are then exposed to the pesticide/bait, who could then return to their colony to expose more insects.

As disclosed herein and also in co-owned U.S. Pat. Nos. 10,123,522, and 10,412,952, which are incorporated by reference in their entirety, having an insect device with a raised portion to create a gap is enticing to insects. Furthermore, the use of an adhesive member in an upper portion of the gap in order to trap insects, with or without wings, has been shown to be more effective and efficient in the monitoring and capturing of insects. The insects are able to pass into the gap without realizing the location of the adhesive member and become affixed thereto, upon which time it is too late for them to continue on. Still further, it should be appreciated that pesticides could also be used in conjunction with the adhesive member such as on the adhesive member or adjacent the adhesive member such as on the surface or surrounding areas to further aid in capturing and killing insects with the insect device 10.

Figure 9:
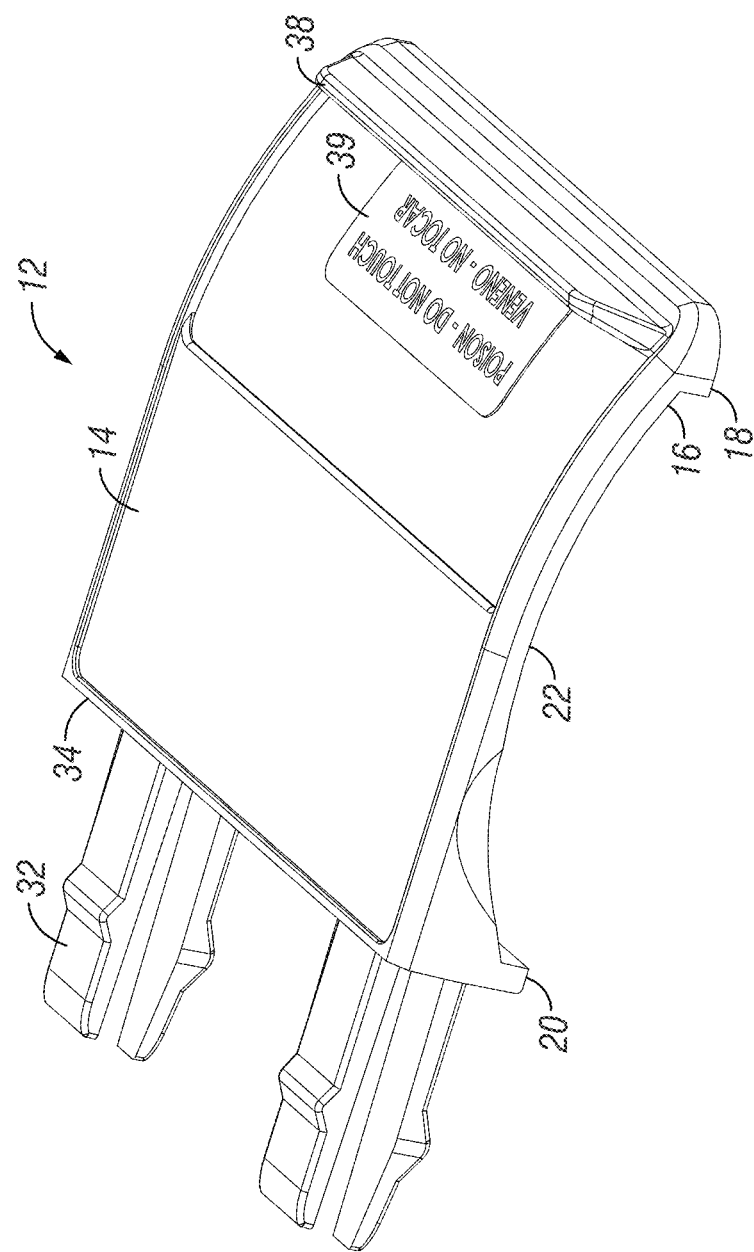
FIG. 9 is a perspective view of the housing of an insect capture device according to embodiments and/or aspects disclosed herein.
Figure 10:
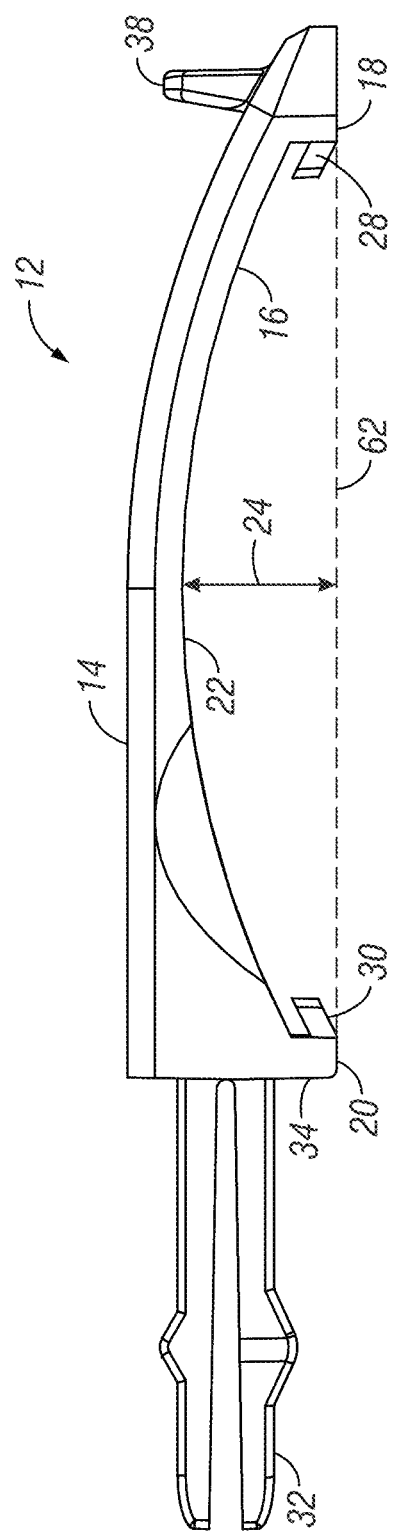
FIG. 10 is a side elevation view of the housing.
Figure 11:
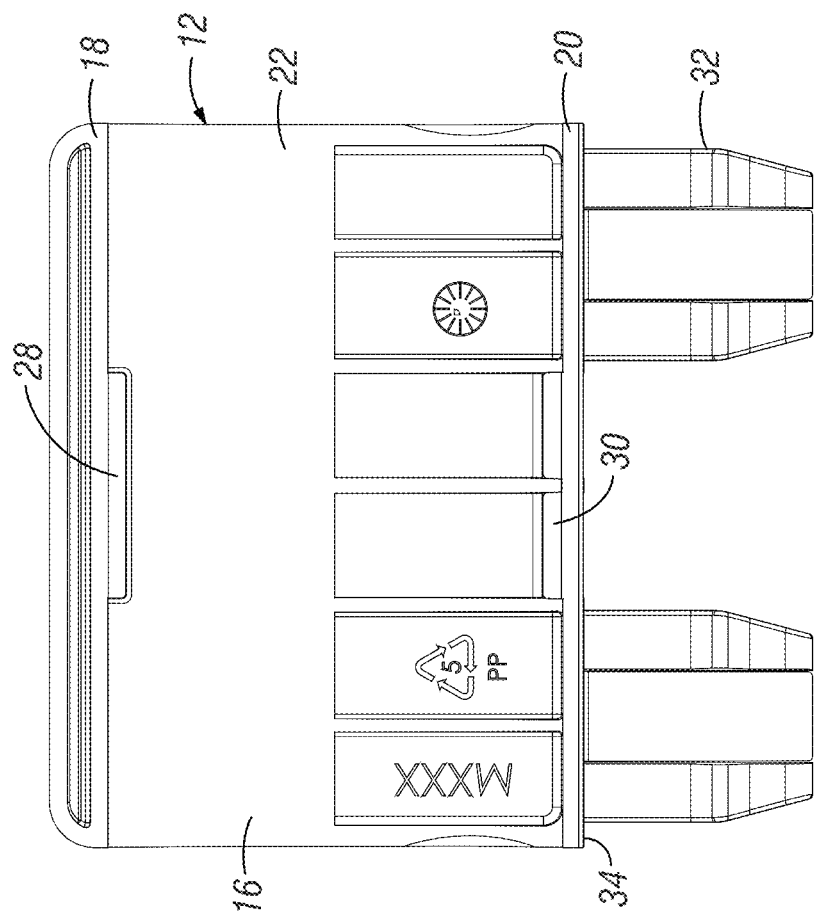
FIG. 11 is a bottom, plan view of the housing.

Referring now to FIGS. 9-11, exemplary housing 12 for use with the insect capture device 10 is shown. The housing 12 comprises a member having an upper or outer side 14 and an opposite or inner bottom side 16. The terms outer and inner refer generally to the use of the device and in conjunction with the insects. For example, the inner side 16 of the housing 12 will generally be facing the surface on which the device 10 is placed, while the outer or upper side 14 is positioned opposite and away from the surface for use. At or in conjunction with the inner side 16 are a first and second foot or support members/surfaces 18, 20. These components of the housing 12 are used as a portion of the housing 12 to be positioned on the support surface. For example, when the surface is a floor, the housing 12 will be positioned and supported via the feet 18, 20 on the surface. In addition, as noted, the housing 12 includes a raised portion 22 at the inner side 16 of the housing 12. The term raised refers to the fact that there is a gap 24 positioned between generally at least one of the feet 18, 20 or the surface 62 and the inner wall 16 of the housing. This is shown best in FIG. 10, where the gap 24 is shown via the width between the surface 62 and the raised portion 22.

As shown in FIG. 10, the raised portion and generally the inner section 16 is an arched or curved shape spanning generally from a first support foot 18 to the second support foot 20. The arched, curved, or dome shape is enticing to insects and will aid in attracting the insects to pass thereunder. However, it should be appreciated that the dome, curve, or arched shape is not needed in all embodiments. For example, the housing 14 could include generally right angles that have a raised section 22 with a gap that has a rectangular, square, or other geometrical shape when looking from the side, such as in FIG. 10. Furthermore, the height of the gap 24 from generally the surface 62 to the raised portion 22 can vary depending on the type of insect to be attracted and captured by the device 10. Therefore, while a curved and dome shape is shown, it should be appreciated that the invention is not limited to such a shape, and that generally any housing having a raised portion in which there is a gap 24 between a lower portion of the housing, such as a support or foot and the raised portion 22 to entice and having a mounting surface for an adhesive member should be considered to be included as part of the present disclosure.

Also shown in the figures for the housing 12 are support ribs 26. The support ribs 26 are provided as both support for an adhesive member, also to provide support to the housing such that it is able to support itself and maintain structural integrity to the use and lifespan of the device. The exact number and type of support ribs 26 are not to be limiting on the invention.

Shown best in FIG. 10 are a first notch or ledge 28 and a second notch or ledge 30. The first notch 28 is positioned generally at or near the first support member 18 and positioned on the inner section 16 of the housing 12. It is also noted that the first notch 28 is positioned generally at a beginning of the raised portion 22, such as at the rear of the housing 12. The second notch or ledge 30 is positioned opposite the first notch or ledge 28, and is generally positioned at or near the second support member 20 of the housing 12. It should be noted that the notches 28, 30 are positioned on generally opposite ends of the raised inner section and spanned substantially the length of the raised inner section 22. As will be understood, the notches or ledges 28, 30 are used to install and support an adhesive member, such as a glue board 50, as will be explained herein. While the components are referred to as a notch or ledge, it should be appreciated that these are not to be limiting. For example, the notches or ledges 28 are used to hold an adhesive member, such as a glue board, as has been disclosed. Therefore, the width of the notches, as well as the exact configuration, shape, and/or type of ledge can be varied, such as according to the type of adhesive or glue board, including the shape, thickness, and/or type of glue or adhesive to be used with the housing 12 of the device 10. Furthermore, while both a first and second notch or ledge 28, 30 are shown in the figures, it should be appreciated that they may not need both to be required in both instances. For example, it is envisioned that only one notch or ledge be used to support the glue board or adhesive with the device 10. Still further, as best shown in FIG. 11, the notches or ledges do not span the entire width of the housing 12, but could be varied to span said full length or generally at any portion of the width of the housing.

However, having both the first and second ledges 28, 30 will aid in conforming an adhesive, such as a glue board 50, generally to the shape of the raised portion 22 of the housing 12. For example, when a curved shape for the raised portion is used, such as is shown in the figures, the first and second ledges 28, 30 will aid in conforming the glue board to said curved shape, which will enhance the usage by making sure that the glue board is substantially close to the inner surface 16 along the raised portion, which has been designed to entice and capture insects of varying sizes. Still further, it should be appreciated that the ledges or notches 28 are shown to be generally flange like members protruding out from the inner portion 16 or the housing 12. However, it should also be appreciated that the notches 28, 30 could be formed such as pockets or other apertures extending into a portion an inner wall 16 and not need to be protruding outward therefrom. In any aspect, the notches or ledges 28, 30 will be used to aid and holding an adhesive, pesticide, or other board like member for use with the housing 12.

Additional components of the housing 12 include protrusions 32 in the form of snap like members. The protrusions 32 can be used when the housing 12 will be used with a base member 40. The snap like protrusion 32 can extend into a portion of the base to temporarily hold the housing 12 in connection with the base member 40. This will allow for placement of the housing 12 relative to the base, but will also provide for an easy to remove feature and removal of the housing relative to the base 40, such as for a replacement of components, or even monitoring of the station 10. The housing 12 includes a face portion 34, which will generally mate with the base potion 40, such as at the base 42 thereof, in order to connect the pieces together.

Figure 12:
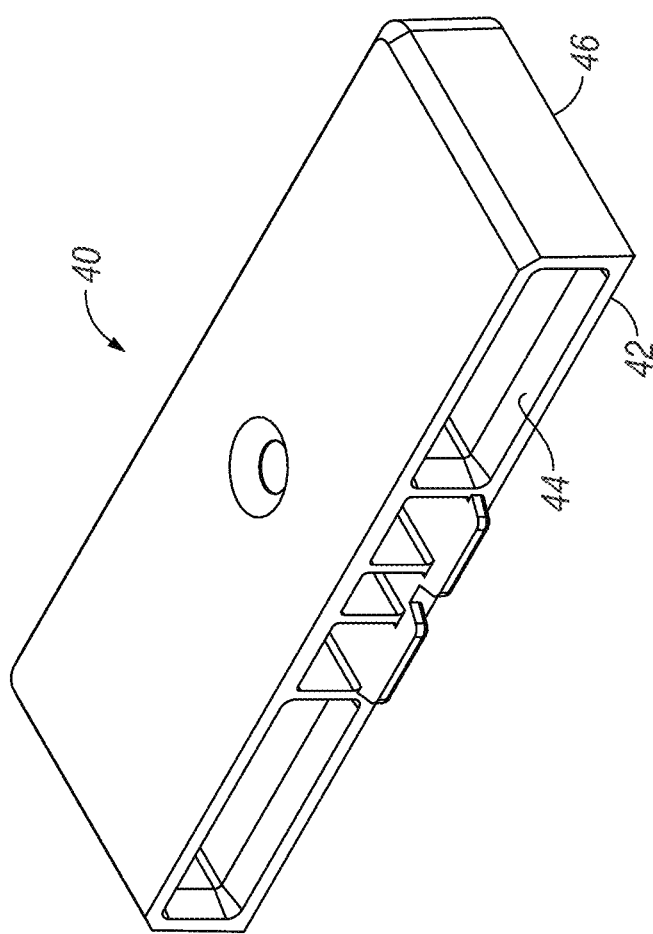
FIG. 12 is a perspective view of a base member of an insect capture device according to embodiments and/or aspects disclosed herein.

Still further, as best shown in FIG. 12, the base 40 has apertures 44 that will allow for the insertion of the snap members 32 of the housing 12 to be inserted therein to connect, at least temporarily, the housing 12 to the base portion 40. The base 40, as shown in FIG. 12, includes a mounting surface 46. The mounting surface is an area which can be mounted to a surface, such as surface 62. The base 40 can be connected or positioned on the surface 62 in a number of ways, including mechanical connecting means, adhesives, resting or otherwise simply placing, or generally any number of ways to affix a permanent or non-permanent manner.

Referring back to FIG. 9, additional components of the housing 12 are shown with respect to the outer or upper side 14. For example, the upper or outer side may include a protrusion 38 in the form of a lifting fin or other fin like member. The protrusion 38 can be used to aid in lifting the housing at a location. Still further, the outer portion can include a section for a label 39. The label can be in the form of a sticker, paint, mold, or the like. For example, the label section 39 can be used to provide some sort of information for use of the device 10. As shown in FIG. 9, the label 39 includes the words "poison" and "do not touch", in both English and a foreign language. It is envisioned that the label could include the exact type of poison or other chemicals that are used with the device in order to provide information to a user of the device. In addition, it should be appreciated that unit will need not be required in all embodiments.

Figure 2:
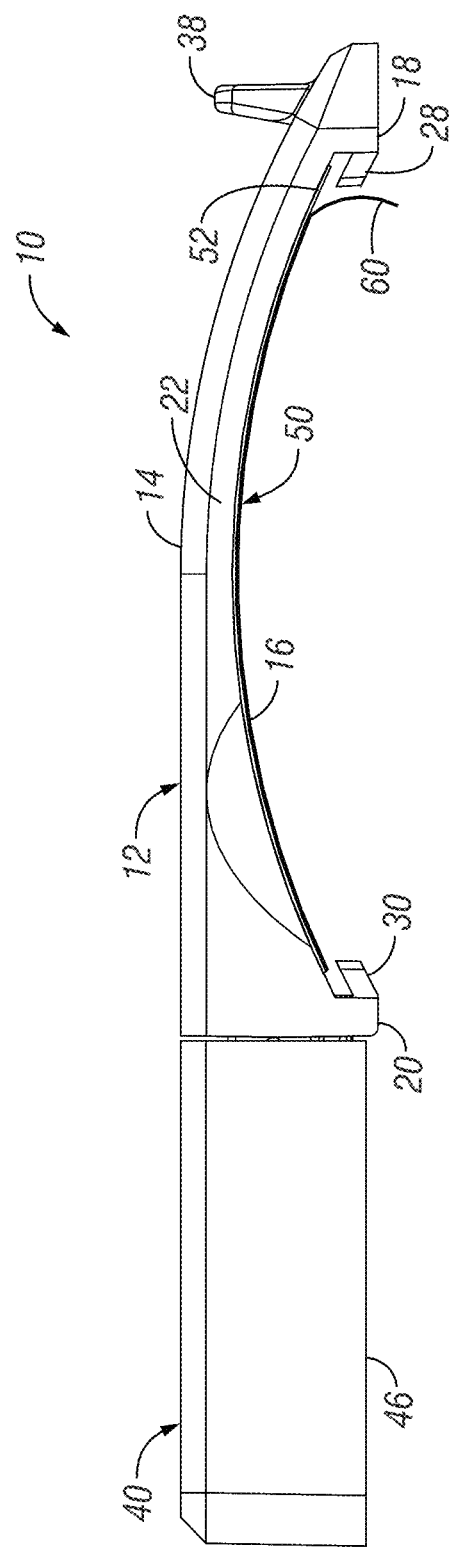
FIG. 2 is a side elevation view of the insect capture device.
Figure 3:
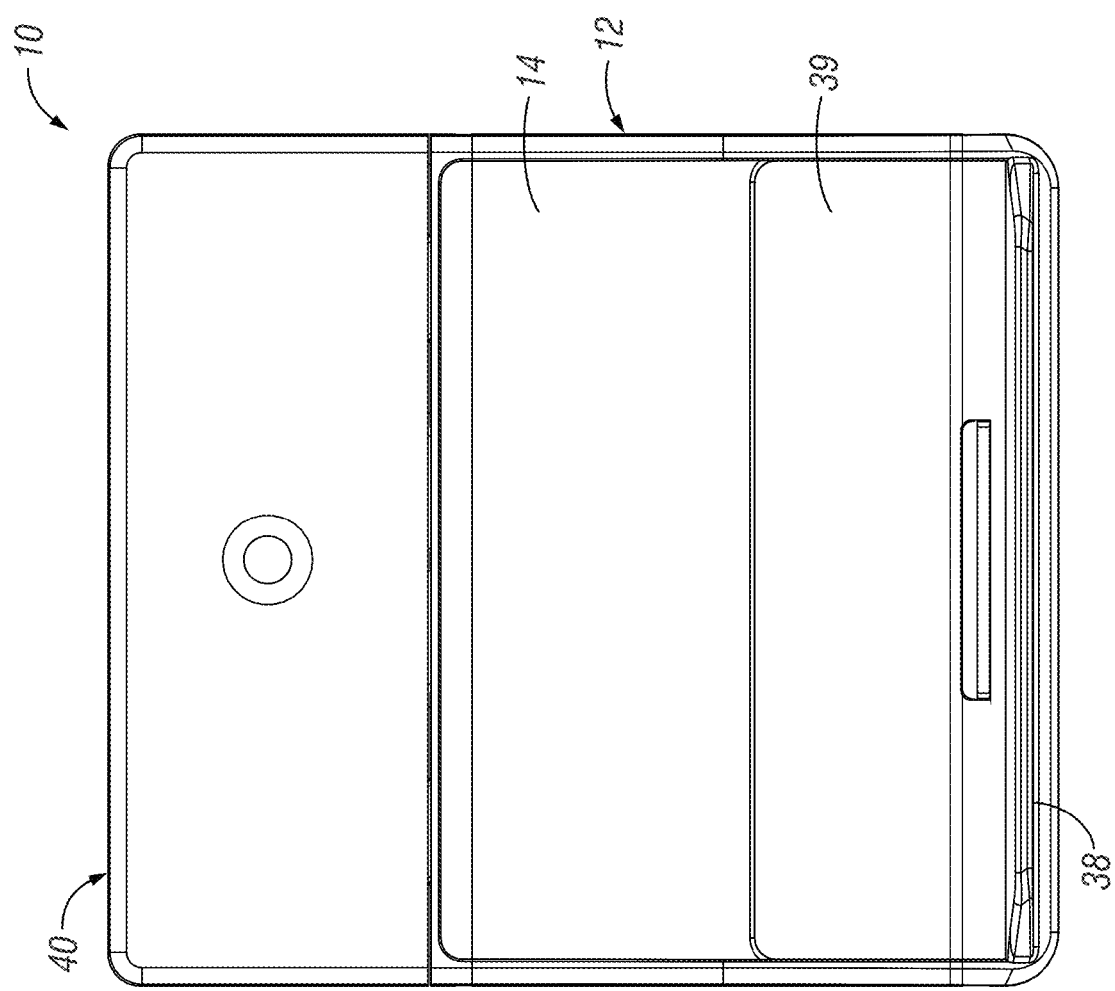
FIG. 3 is a top plan view of the insect capture device.
Figure 4:
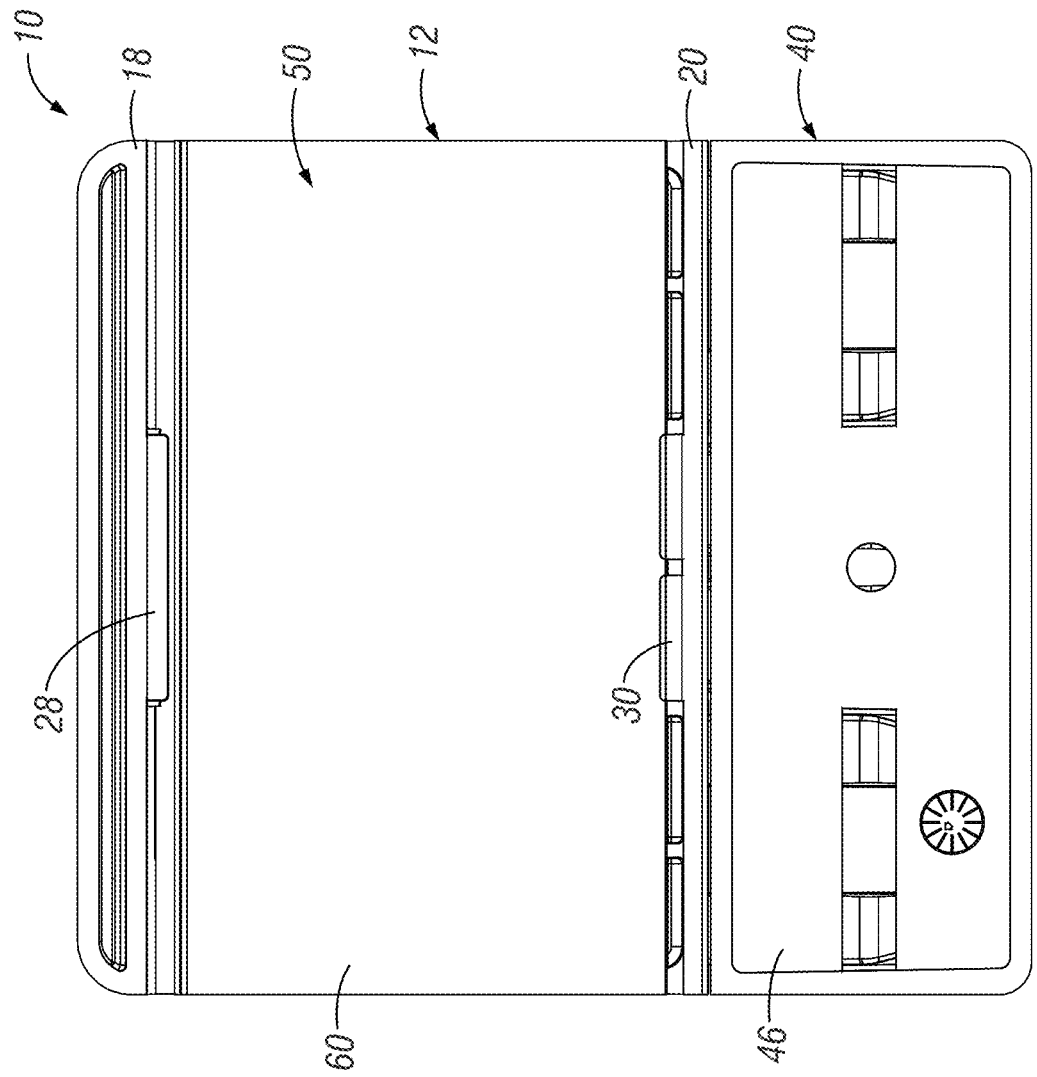
FIG. 4 is a bottom plan view of the insect capture device.

As disclosed, the device 10 using the housing 12 can be used with an adhesive device to capture insects, such as a glue board 50. In addition to that which has been disclosed, the glue board can be positioned relative to portions of the inner side 16 of the housing 12, such as the notches 28, 30, in order to conform the shape of the glue board 50 to match or substantially match the of the raised portion of the housing 12. This is shown in FIGS. 1 and 2. As shown in FIGS. 1 and 2, the glue board 50 is positioned at the underside or inner portion 16 of the housing 12. Furthermore, the glue board has a base portion 52 which can be positioned generally within the notches or ledges 28, 30, which aid in holding the glue board in place relative to the housing 12. Still further, as the notches are on the opposite sides of the raised portion 22 of the housing 12, the notches urge the glue board 50 to take generally the shape of the raised portion 22. For example, as shown in FIG. 2, the raised portion 22 is in a curved or arched shape. Therefore, the glue board has been urged to be in the same or similar arched or curved shape of the raised portion 22 as well. The notches and/or ledges 28, 30 aid in holding the glue board in place at the inner portion 16 of the housing 12.

However, when the raised portion takes additional or alternative shapes, including generally planar parallel shapes to that of the ground, or having more squared off sections, the notches or ledges can still hold the glue board 50 in place relative to the housing to aid in capturing insects. For example, it is envisioned that the raised portion 22 be generally parallel to the surface of the location of use, such that the raised portion 22 will be substantially parallel and possibly planar as well. It could have one singular height spanning from one ledge 28 to the other 30. In such situation, the glue board may conform to the general planar shape and be generally parallel to the surface of use, such that the height of the glue board be substantially the same from one end to the other. Still further, and as will be understood, the glue board includes an adhesive portion. The adhesive portion is positioned on the base 52 and is positioned to be exposed away from the housing 12 and towards the surface 62. Therefore, when the glue board is positioned similar to that shown in FIG. 2, the portion of the glue board 50 adjacent the inner wall 16 of the housing 12 may or may not have an adhesive, while the opposite side of the adhesive facing the surface 62 and positioned generally away from the housing 12 can have an adhesive side. Such an adhesive can be used to catch or trap the insects passing thereby, such as by the wings or upper portion thereof or even feet thereof. However, it should also be appreciated that the glue board 50 include adhesive on both sides thereof. This would allow the glue board to be affixed, at least temporarily to the inner wall 16 of the housing 12, having both sides have an adhesive can aid in the conforming of the shape of the glue board to that of the raised portion 22 of the housing 12, while still having an adhesive exposed to the gap below the inner wall 16 of the housing 12 to be able to catch and capture insects passing therethrough. In such a situation, it is to be appreciated that the adhesives need not be the same. For example, the adhesive on the base portion attached to the housing wall 16 could have less adhesive qualities than that of the insect side. This would allow for the easy installation and removal of the glue board 50 relative to the housing 12, while maintaining a strong adhesive for capturing and catching of any insect passing therethrough.

Figure 5:
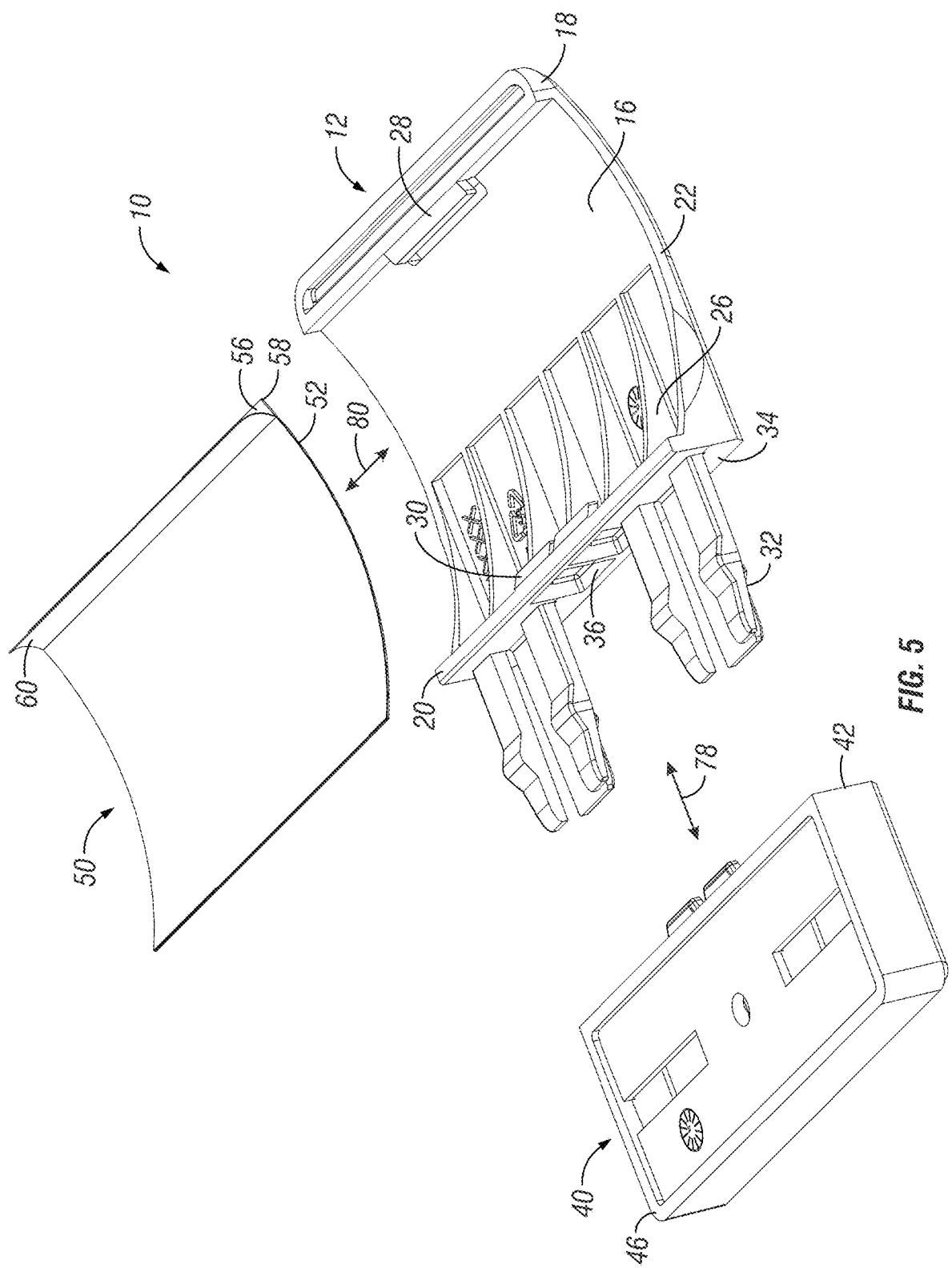
FIG. 5 is an exploded view of the insect capture device.
Figure 6:
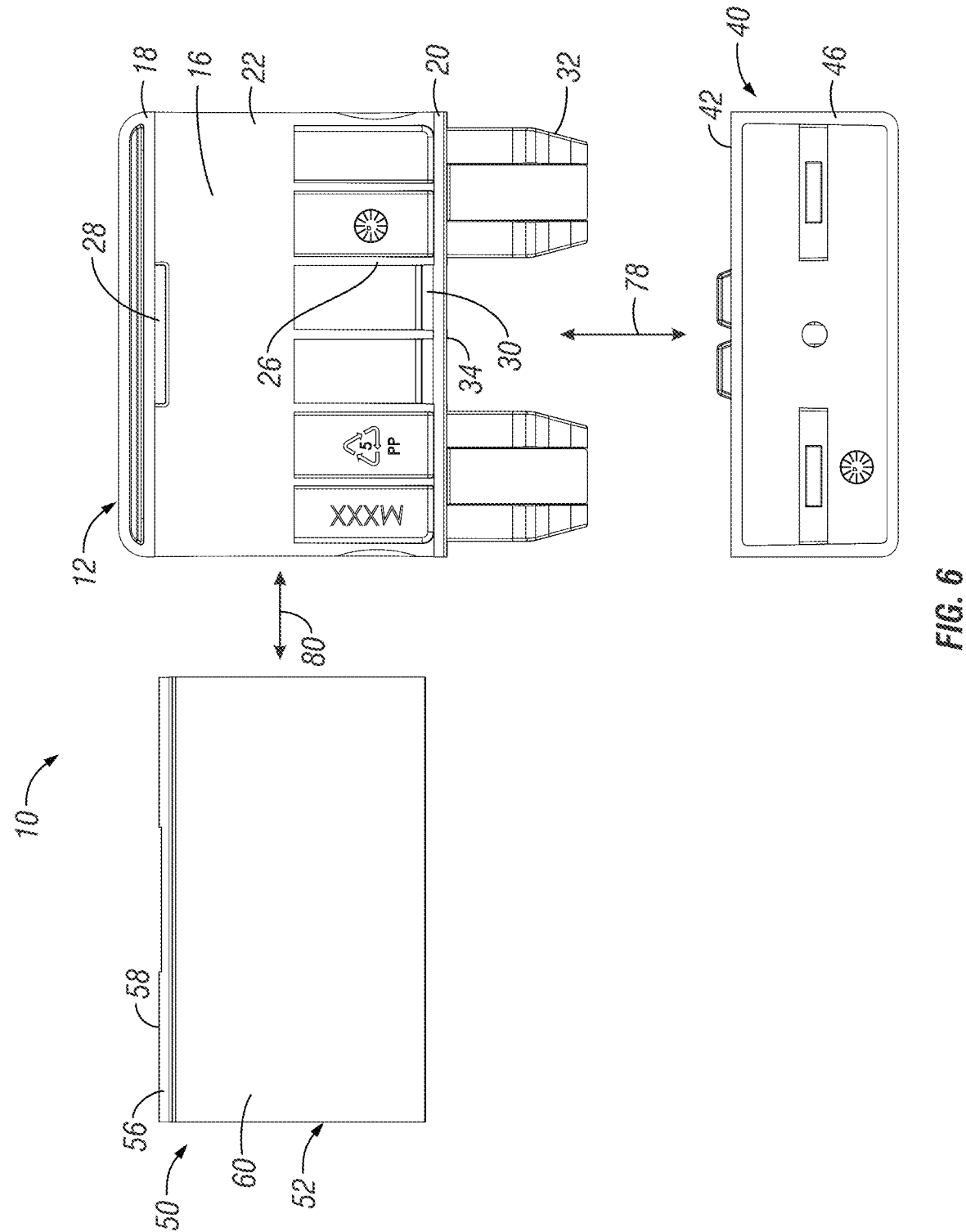
FIG. 6 is an exploded, bottom view of the insect capture device.

FIGS. 5 and 6 are exploded views of the housing 12, base 40, and glue board 50 of the insect capture device 10. The exploded views can aid showing how the components can be connected to one another. For example, as shown in FIG. 5, the housing and base can be moved along the arrows 78 in the direction of the arrows 78 to insert the snapped 32 to the aperture 44 of the base in order to affix, at least temporarily, the housing 12 to the base 40. In addition, while not installed in such a manner, for exemplary purposes, the glue board 50 can be moved via the arrows 80 in FIGS. 5 and 6 which would show the placements of the glue board 50 at the inner walls 16 of the housing 12, and nestled generally in the notches or ledges 30 thereof. Therefore, FIGS. 5 and 6 should not be limiting but should be used to show how the components can be positioned relative to one another to be used as an insect capture device 10.

Figure 7:
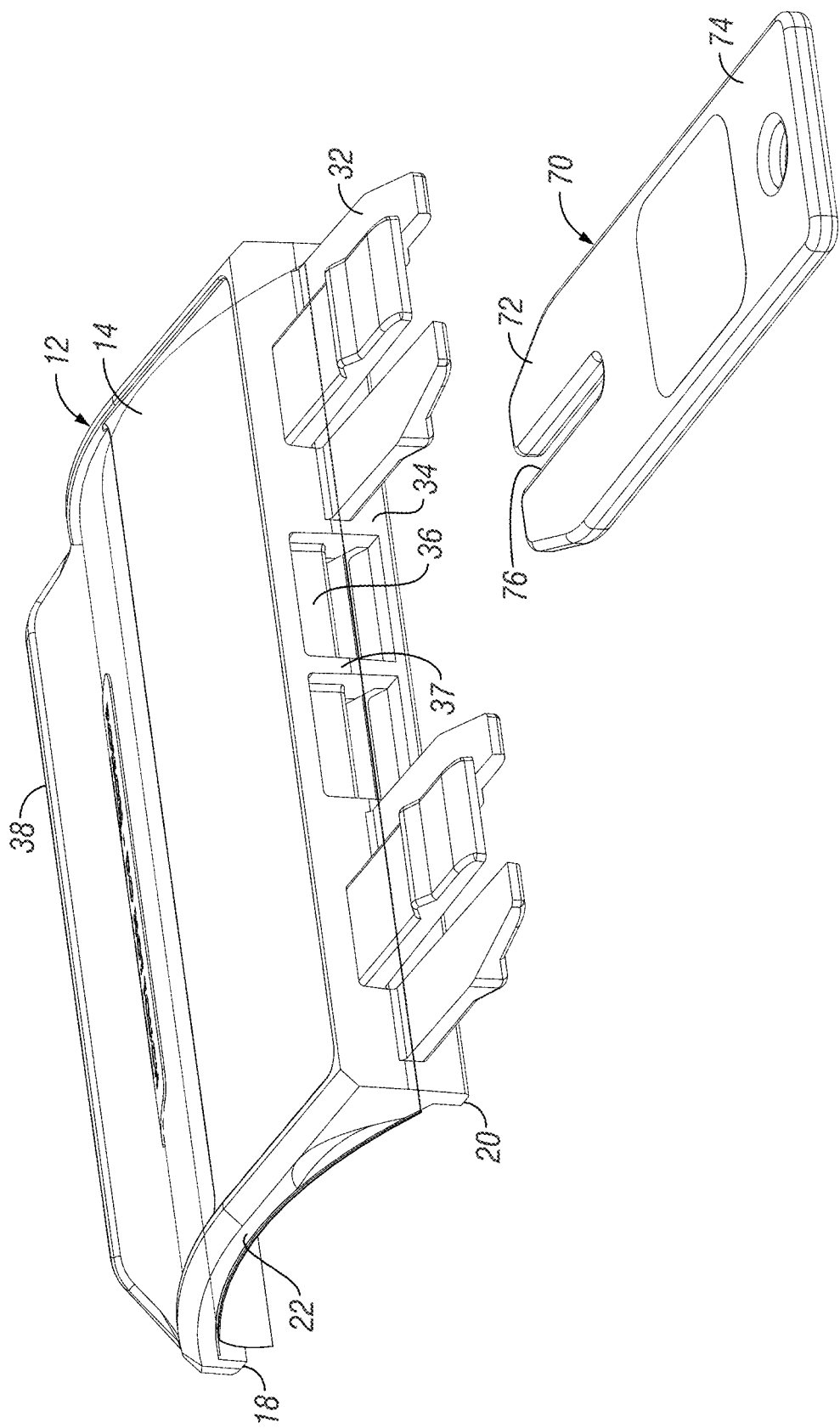
FIG. 7 is an exploded view showing additional aspects of a housing and removal key in exploded form.
Figure 8:
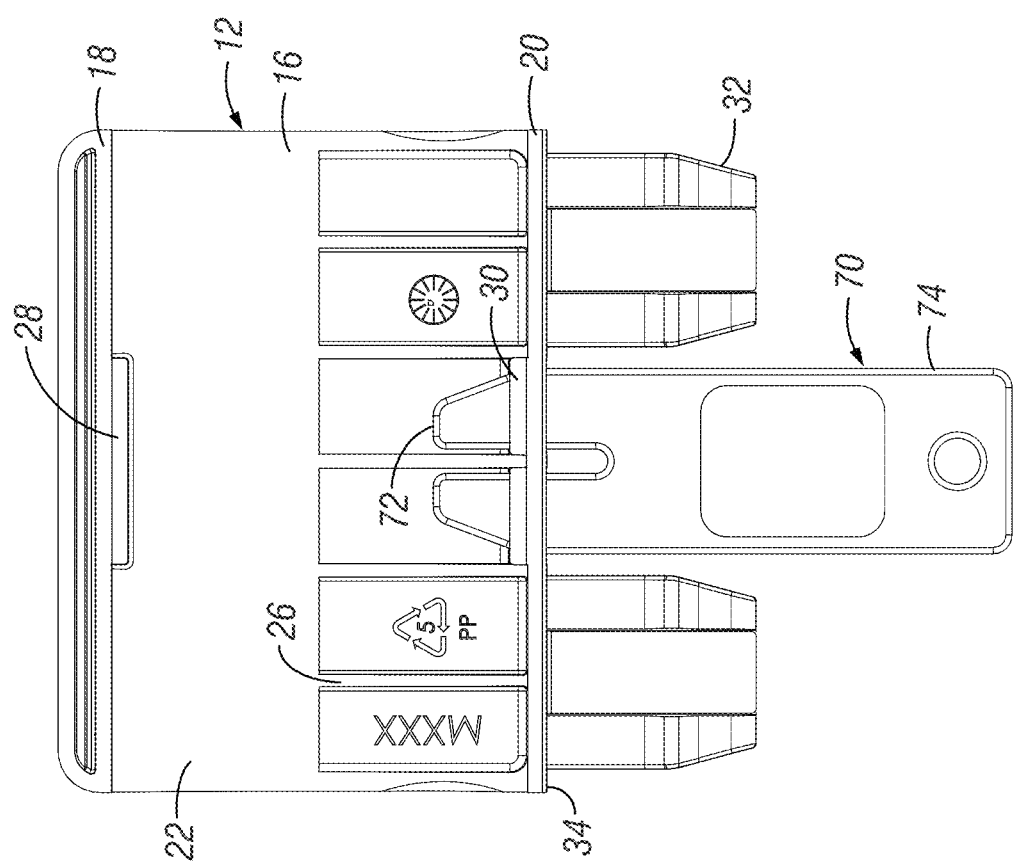
FIG. 8 is a bottom, plan view of the housing and removal key.

An additional feature of the insect device 10 is shown in FIGS. 7 and 8. As shown in FIGS. 7 and 8, the housing 12 is shown. On the connecting face 34 of the housing 12, there are shown to be apertures 36 and a dividing wall 37. It should be noted that the apertures 36 going through the front face 34 of the housing 12 are positioned such that they are intersecting with the curved inner wall 16 of the housing 12. A removal key 70 is also shown in the figures. The removal key 70 includes key arm 72 and an inlet 76 connected to a base 74. The arm 72 and inlet 76 are configured to match or at least be used with the aperture 36 and wall 37 of the housing 12. As noted, the glue board can include an adhesive on both sides thereof. When such a configuration is used, there may be increased difficulty to remove the glue board from the inner wall 16 of the housing 12. In such a situation, the removal key 70 could be utilized with the housing 12 to aid and urge the removal thereof. For example, the key arm 72 are lined with the inlet 76 in the wall 37 as well as with the aperture 76 of the housing 12. Insertion of the arm 72 into the aperture 36 will contact the arms with the interior portion of the glue board adjacent the wall 16 thereof. This will urge disconnection of the glue board from the wall 16, which will aid in the removal of the glue board by creating an initial separation thereof, at which time a user can continue the separation thereof, such as by continuing the peeling of the glue board from the inner wall 16 of the housing 12. In addition, even when the glue board does not have the adhesive on the wall side thereof, the key 70 can still be used to aid in removing the glue board 50 from the housing 12, such as by releasing or separating the glue board from the ledge or notch 30, which will make it easier to remove the glue board from the interior side of the housing 12.

Figure 17:
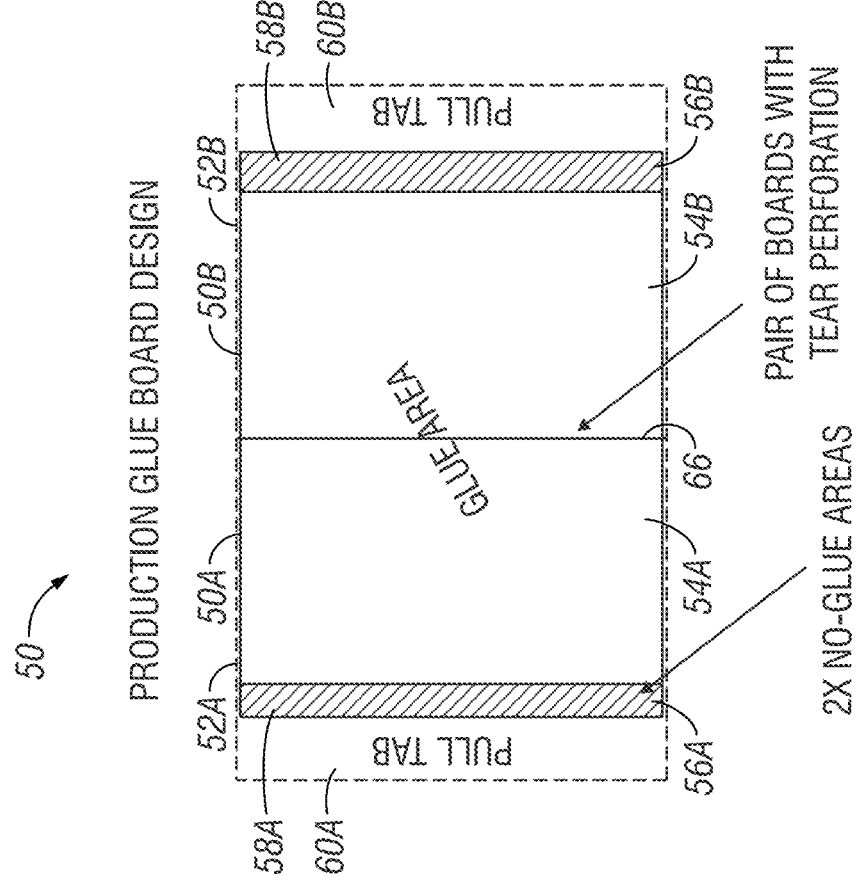
FIG. 17 is a schematic of a production glue board for use with the embodiments and/or aspects disclosed.

As noted herein, a glue board 50 has been described as being used with the housing 12. The glue board 50 is utilized to provide an adhesive portion to capture or catch insects. The glue board and/or the device 10 can also include a pesticide or other killing agent to both capture and kill insects passing therethrough. While it is to be appreciated that generally any type of glue board capable of capturing and/or killing insects can be used, FIGS. 13-15 and 17 provide an exemplary embodiment of a glue board for use with the housing and according to aspects and/or embodiments of the present invention. As best shown in FIG. 17, the glue board 50 is provided in schematic form. It should be noted that FIG. 17 actually shows two glue boards, which will be designated by A and B identifiers in addition to the numerals thereof. For example, as shown in FIG. 17, a perforated line 66 is provided which allows for two boards, 50A and 50B, to be made at the same time. While not needed in all instances, it can aid in the manufacture thereof. However, as will be understood, a single board can be made and utilized as well. The exemplary glue board 50 is used with the housing 12 will be shown with respect to one of the sides as shown in FIG. 17. For example, it should be appreciated that the left side of FIG. 17 is notified as glue board 50A. It should be appreciated that 50B will be generally the same and opposite in a mirrored fashion thereof. The glue board 50A includes a base portion 52A. The base portion can be cardboard, paper, polymer, wood, steel, or generally any other material for holding the components of the board 50. The base portion 52A includes a first section 54A, which includes a glue or other adhesive positioned and on the base 52A. Adjacent the first section 54A is a second section 56A. The second section 56A is a no glue area, at least on one side thereon. It should be appreciated that the second section 56A having no glue or adhesive is generally at or near a periphery 58A thereof and is also sized smaller than the first section 54A including the glue or adhesive. As will be understood with respect to the installation and servicing of the device 10, having the first section 54A with the adhesive or glue, and an adjacent section 56A at a periphery 58A and having generally no glue or adhesive will allow for the easy installation and removal of the glue board 50A with respect to the housing 12. Likewise, the same features are found in glue board 50B, including the base 52B, the first section 54B with the adhesive, and the second section 56B being substantially free of adhesive at and near the periphery 58B thereof.

In addition to the glue board itself, a protective cover 60, which is shown as 60A and 60B in FIG. 17, can be provided. The protective cover comprises paper, such as wax paper or other material that can be temporarily adhered and removed without substantial ripping or tearing, which may also be referred to as a pull tab, can cover the adhesive first section 54A until such time that the glue board 50A has been installed with respect to a housing 12, to protect the adhesive portion until such time it will be positioned and utilized in the field, such as when it is positioned at a surface. However, it should also be appreciated that the pull tab or cover 60A may not be required in all embodiments or aspects thereof.

The no glue second section 56A acts as the glue keep out which may be required or otherwise useful for production rollers to pull the glue board down a production line. This also functions as a mounting feature, as will be understood, useful to install the glue board 50 quickly and effortlessly with the pull tab or protective cover 60A remaining free of the plastic undercut.

Figure 13:
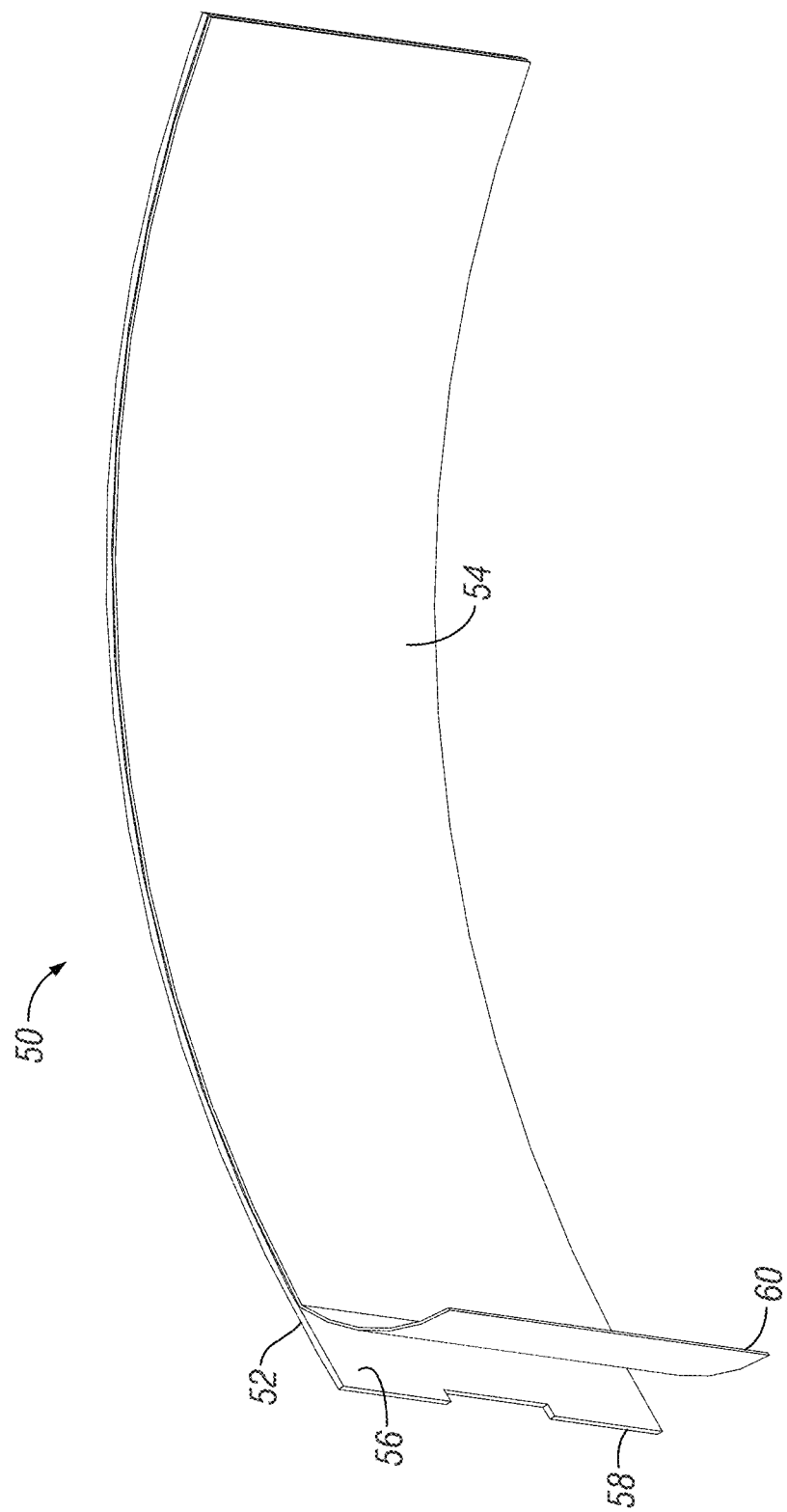
FIG. 13 is a perspective view of a glue board for use with an insect capture device according to embodiments and/or aspects disclosed herein.
Figure 14:
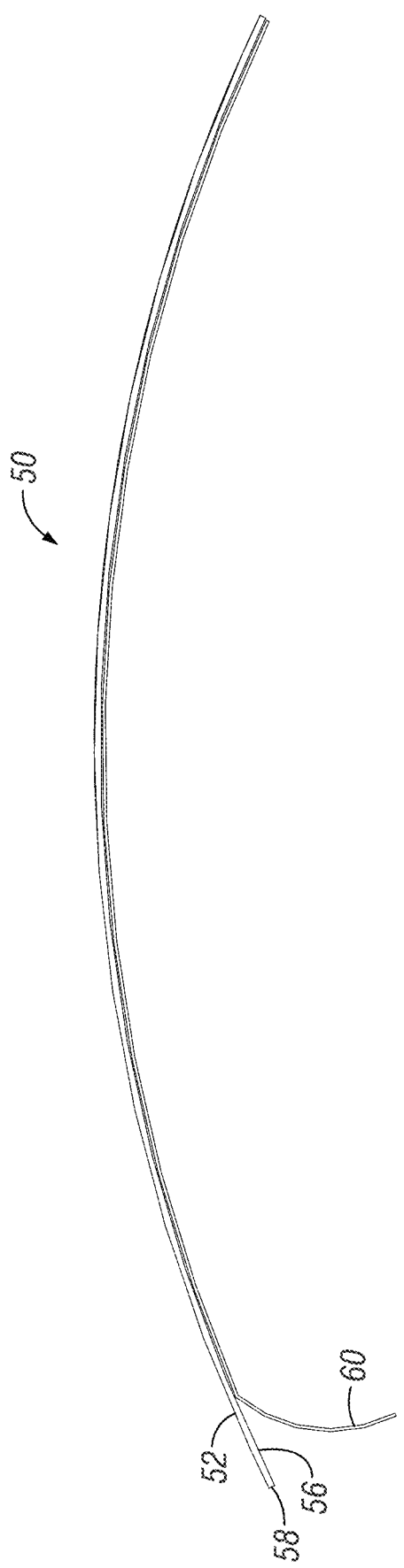
FIG. 14 is a side elevation view of the glue board.

Such as glue board is shown in FIGS. 13 and 14 after production and after being separated via the perforation line 66. Therefore, as shown in FIGS. 13, 14 only one portion of the dual made glue board is included. As noted, the glue board 50 includes the base 52. Furthermore, the glue board will include a first section 54 having the glue or other adhesive and a second section 56, which is substantially free from glue or adhesive. This is further illustrated by the protective cover 60 being adhered to the first section 54, while being generally separated from the second section 56. This may be due in part to the second section 56 not having a glue or other adhesive thereat, which will prevent or preclude the cover 60 attaching thereto. Still further, it should be appreciated that the second section 56 is generally at or near perforated 58 of the base 52. As will be understood, this will aid in the installation and servicing of the glue board for use with the housing 12 of the insect capture device 10.

As best shown in FIGS. 16A-16D, the installation procedure of the glue board 50 will be described. While the installation shown in the figures is provided, it should be appreciated that it is not limiting, and other manners of installation are to be envisioned and included. However, the figures and description are included for purposes of disclosure and to show the advantages of the glue board having a section of glue adjacent a section of non-glue for purposes of use with the housing 12 of the insect device 10.

Figure 16D:
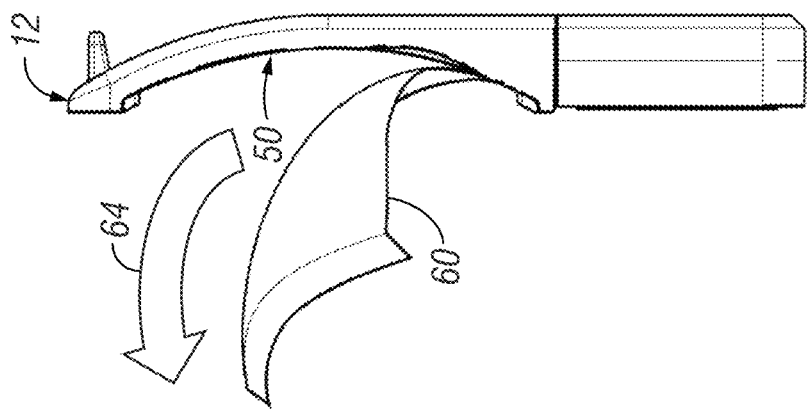
FIGS. 16A-16D show depictions of the install of an exemplary insect capture device and removal of the protective cover from a glue board.
Figure 16C:
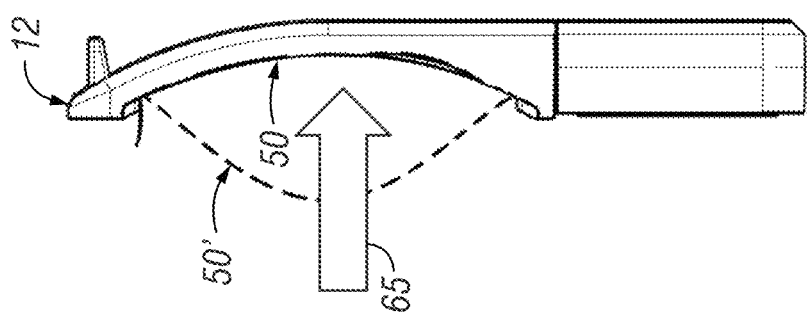
Figure 16B:
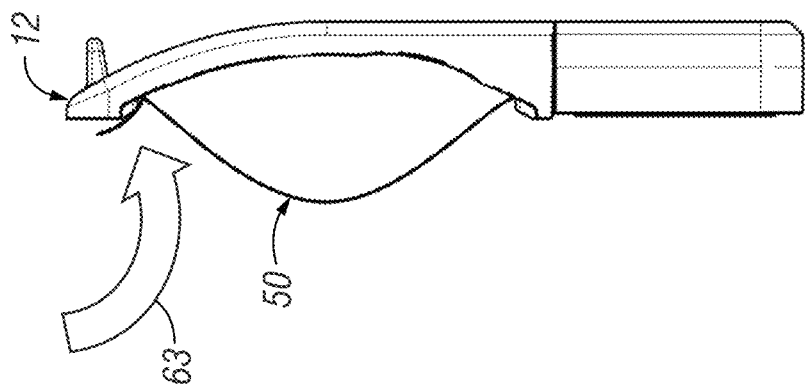
Figure 16A:
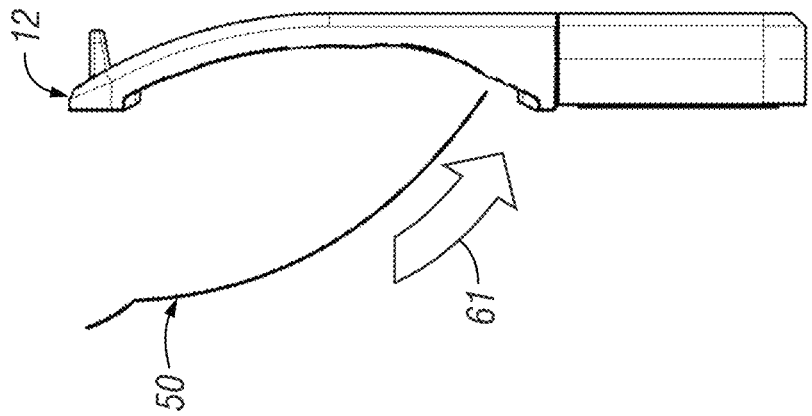

Therefore, as shown in FIGS. 16A, the glue board 50 having the protective cover 60 is inserted in the second notch or ledge 30 of the housing 12 at the inner side 16 thereof. This is shown generally by the arrow 61. It will be noted that the portion inserted into the ledge 30 generally includes the section 54 of the glue board 50 having the adhesive and being covered at least in part by the protective cover 60. Next, the opposite edge 58 of the glue board 50 which is the second section 56 having substantially no glue or adhesive thereat is positioned into and in connection with the first ledge or notch 28 at the inner side 16 of the housing 12. See, e.g., FIG. 16B, with the arrow 63 showing the positioning of the board into the notch. As shown in FIG. 16B, both sides of the glue board are positioned generally in the notches 28, 30. However, it is also noted in FIG. 16B that the glue board is not necessarily conforming to the shape of the raised portion 22 of the housing 12.

This can be easily rectified such as shown in FIG. 16C, where the glue board is manipulated to conform generally to the shape of the raised position 22 of the housing at the inner portion 16 thereof. As shown, the glue board 50 is initially shaped in a convex manner, such as is shown by the dash line 50' in FIG. 16C. Pressure can be applied, such as in the direction of the arrow 65, which moves the glue board 50 into generally conformity with the shape of the housing 12, which is shown by the solid line 50 in FIG. 16C. In addition, as has been disclosed, the glue board can include an adhesive in full or part on the housing side to aid in conforming of the shape and maintaining the position of the glue board relative to the housing, but it is not required or included in all embodiments or aspects disclosed.

Figure 15:
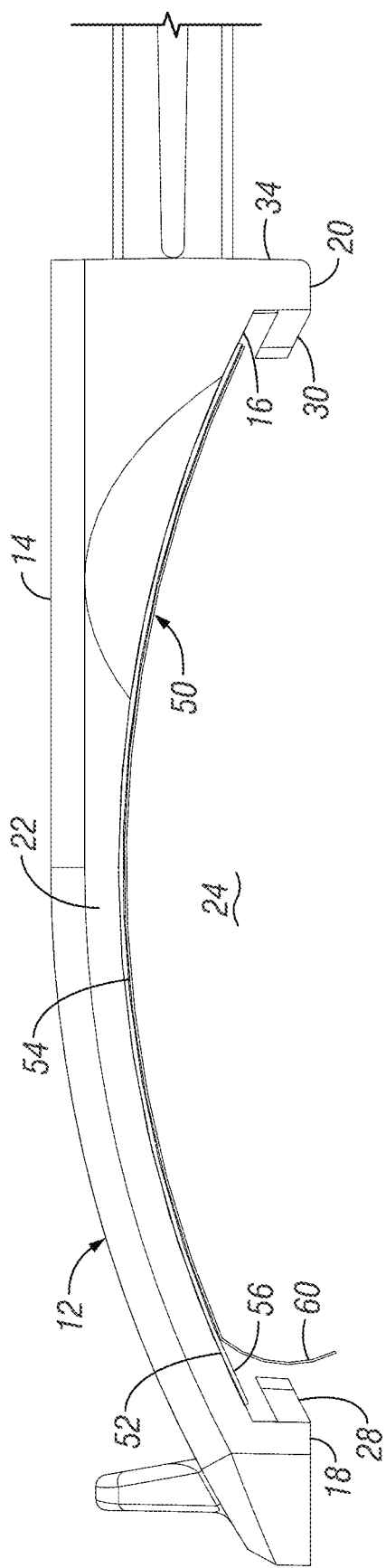
FIG. 15 is an enlarged, side elevation view of the housing and glue board.

Next, as shown best in FIG. 16D, once the glue board 50 has been positioned between the notches 28, 30 and has been manipulated to generally conform to the shape of the raised portion of the housing, before the device can be used, the adhesive of the first section 54 of the glue board 50 needs to be exposed. Therefore, the protective cover can be peeled from the adhesive first section 54 of the glue board 50. This is shown generally by the direction of the arrow 64 in FIG. 16D. the paper will generally pull off of the glue board simply and pulling in a single motion due to the composition of the protective cover and the glue board. This will allow for a full exposure of the adhesive first section 54 positioned away from the housing 12 and towards the surface 62 such that the full adhesive 54 of the glue board 50 can be used to attract and capture any insect passing therethrough or thereunder. The completed installation is shown in FIG. 15, where the glue board 50 has been positioned between the notches 28, 30. It should be noted that FIG. 15 does include the protective cover or paper 60 in conjunction and connected to the glue board 50. However, once the housing 12 is placed for final position, the cover 60 can simply be peeled from the glue board 50 such as in the arrow 64 shown as FIG. 16D to remove and expose the adhesive away from the housing for use in catching and capturing an insect passing thereby.

Therefore, a combination of an insect capture device including a housing and a glue board has been shown and described. It is noted that combination can include numerous variations and need not include every single aspect and/or feature as disclosed herein. Still further, it should be appreciated that while some variations have been shown and described, any of the variations of any of the embodiments can be combined to create new embodiments or aspects, including those not explicitly shown or described herein. Still further, it should be noted that the combination of the glue board with the sectioned adhesive and non-adhesive being adjacent to one another for use with a housing having a raised portion to allow for insects to pass thereto and to be exposed to the adhesive section will provide an improved insect device for monitoring, capturing, trapping and/or killing insects passing thereto.

From the foregoing, it can be seen that the invention accomplishes at least all of the stated objectives.

The invention claimed is:

1. In combination, an insect capture device and an adhesive member, comprising:
   the insect capture device comprising a housing having a raised portion to create a gap between the raised portion and a surface; and
   the adhesive member comprising a first section comprising an adhesive and a second section adjacent the first section and being substantially free from any adhesive;
   wherein the adhesive member is positioned at an underside of the raised portion of the housing of the insect capture device with the first section of the adhesive member facing the gap;
   wherein the housing comprises first and second support members on opposed ends of the raised portion;
   wherein the first and second support members are configured to touch the surface when the combination is in use; and
   wherein when the first and second support members touch the surface, the first and second support members form a partial enclosure between the raised portion and the surface such that the first and second support members do not create a sealed enclosure entirely surrounding the gap;
   wherein the housing of the insect capture device further comprises at least one notch on either of the first and second support members, and wherein the adhesive member is positioned at least partially in the at least one notch.

2. The combination of claim 1, wherein the raised portion of the housing comprises a curved shape.

3. The combination of claim 1, wherein the at least one notch comprises first and second notches opposite one another on the first and second support members to receive opposing edges of the adhesive member.

4. The combination of claim 3, wherein the second section of the adhesive member is configured to be positioned in one of the first or second notches.

5. The combination of claim 1, wherein the adhesive member is a glue board, and the adhesive is a glue.

6. The combination of claim 1, wherein the adhesive member further comprises a protective cover covering substantially both the first and second sections of the adhesive member.

7. The combination of claim 1, wherein the insect capture device further comprises a base connected to the housing.

8. The combination of claim 7, wherein the base comprises at least one aperture and the housing comprises at least one protruding member, and the at least one protruding member temporarily secured to the at least one aperture to connect the base to the housing.

9. An insect station, comprising:
   a housing comprising an inner portion and an outer portion, the inner portion including a support portion and a raised portion, wherein the support portion comprises first and second support members on opposed ends of the raised portion and said raised portion creating a gap between the first and second support members;
   a glue board positioned at the inner portion of the housing, said glue board comprising a first section comprising an adhesive and a second section adjacent the first section and being substantially free from any adhesive; and
   first and second notches on the first and second support members respectively, and wherein the glue board positioned at least partially in the first and second notches;
   wherein the glue board is positioned to expose the adhesive of the first section to face the gap;
   wherein the first and second support members are configured to touch a surface when the insect station is in use; and
   wherein when the first and second support members touch the surface, the first and second support members form a partial enclosure between the raised portion and the surface such that the first and second support members do not create a sealed enclosure entirely surrounding the gap.

10. The insect station of claim 9, wherein the raised portion comprises a curved shape.

11. The insect station of claim 9, wherein the second section of the glue board being substantially free from adhesive is positioned in the first or second notch.

12. The insect station of claim 9, wherein the glue board further comprises a protective cover releasably attached to the adhesive of the first section and covering both the first and second sections of the glue board.

13. The insect station of claim 9, further comprising a base operatively attached to the housing, the base configured to be affixed to the surface.

14. A system for capturing insects, comprising:
- a housing with a gap between the housing and a mounting surface; and
- a glue board releasably attached to the housing, the glue board comprising a first section including an adhesive for capturing insects and a second section along at least a periphery of the glue board to interact with the housing to hold the glue board in place with the adhesive of the first section positioned towards the gap;
- wherein the housing comprises first and second support members on opposed ends of the gap; and
- wherein the first and second support members are configured to touch the mounting surface when the system is in use; and
- wherein when the first and second support members touch the mounting surface, the first and second support members form a partial enclosure between the housing and the mounting surface such that the first and second support members do not create a sealed enclosure entirely surrounding the gap;
- wherein the housing of the system further comprises at least one notch on either of the first and second support members, and wherein the glue board is positioned at least partially in the at least one notch.

15. The system of claim 14, wherein the second section of the glue board along one or more edges of the glue board, and the glue board further comprising a protective cover releasably attached to the first section and substantially covering both the first and second sections thereof.

* * * * *